United States Patent [19]

Ford

[11] Patent Number: 5,438,852
[45] Date of Patent: Aug. 8, 1995

[54] SELF-GRIPPING TEXTILE GASKET

[75] Inventor: Bruce Ford, Cookeville, Tenn.

[73] Assignee: The Bentley-Harris Manufacturing Company, Exton, Pa.

[21] Appl. No.: 226,476

[22] Filed: Apr. 12, 1994

[51] Int. Cl.⁶ .......................... D04B 1/00; F16J 15/00
[52] U.S. Cl. ..................... 66/200; 49/475.1; 277/181
[58] Field of Search ............ 66/60 R, 170, 199, 198, 66/200; 277/181, 189, 205, 231; 49/475.1, 493.1, 492.1, 490.1, 498.1

[56] References Cited

U.S. PATENT DOCUMENTS

| | | | |
|---|---|---|---|
| 1,657,877 | 1/1928 | Barutio | 49/475.1 X |
| 1,914,217 | 6/1933 | Schlegel | 49/475.1 X |
| 2,414,424 | 1/1947 | Stevens, Jr. | 66/200 X |
| 2,902,305 | 9/1959 | Poltorak | 49/475.1 X |
| 3,578,764 | 5/1971 | Nunnally et al. | 87/6 |
| 4,287,844 | 9/1981 | Weil | 112/412 |
| 4,572,240 | 2/1986 | Van Becelaere | 49/475.1 X |
| 4,747,624 | 5/1988 | Faber et al. | 277/205 X |
| 4,822,060 | 4/1989 | Moyer et al. | 277/166 |
| 5,066,028 | 11/1991 | Weil | 277/230 X |

FOREIGN PATENT DOCUMENTS 482438  3/1938  United Kingdom ................. 66/199

Primary Examiner—John J. Calvert
Attorney, Agent, or Firm—Synnestvedt & Lechner

[57] ABSTRACT

A tubular, thermally insulating gasket product is produced using as a mounting element a bulky knitted tape of glass fiber, ceramic or other heat resistant material. The tape has a main body portion knitted using a rib or interlocking stitch for firmness and body and a lip portion adjacent to the body portion knitted with a plain jersey stitch. The lip portion has an inherent tendency to curl back upon itself so as to hold the body portion on a flanged door frame or the like, freeing the installer's hands for installation of a clamping front frame or other fasteners. A tubular gasket of known construction is fastened to the main body of the tape along a single sew line. For increased flexibility, one or more ladder portions may be formed running lengthwise of the ribbon within the main body portion.

11 Claims, 2 Drawing Sheets

SELF-GRIPPING TEXTILE GASKET

FIELD OF THE INVENTION

This invention relates to products such as tubular gaskets and means for attachment thereof to a flanged surface which is relatively movable with respect to a second surface. The product of this invention may be braided or knitted, are in a preferred application, are formed of a bulky, thermally insulating yarn and a support wire intended for high temperature applications, such as oven door seals.

BACKGROUND OF THE INVENTION

A particular product application for the invention is the attachment of woven tubular gaskets to the door frame of high temperature ovens.

Woven tubular gaskets have been used as oven door seals for many years. These gaskets are typically made from a combination of an inner tubular support member formed of knitted wire and an outer tubular insulating cover member made either by braiding, knitting or weaving from an insulating material such as glass fiber yarn. Such structures have proven to be durable at the high temperatures used in self-cleaning ovens and provide a good seal despite repeated openings and closures of the oven door over many years of use. The inner tubular support member, sometimes called a bulb, provides the necessary resilient support for the glass fiber tubular gasket.

One form of gasket of the type described is a so called "tadpole" gasket manufactured by The Bentley-Harris Manufacturing Company of Lionville, Penn. under the trademark PYROSEAL. These gasket products comprise a tubular knitted element formed of knitted or braided glass fiber yarn and an inner, knitted bulb of stainless steel wire. The tubular gasket is preferably integrally formed with an integral "tail" by a single sew line formed at the base of the gasket. The flexible nature of the tail allows the gasket product to be bent around corners and other irregularities without bunching or pleating. The tail is adapted to be clamped, or fastened using traditional fasteners, to the supporting substrate.

SUMMARY OF THE INVENTION

According to the invention, the gasket, which is preferably a tadpole gasket of the kind just described, is affixed to a temperature resistant knitted tape having a free edge portion constructed so that it is biased to curl back upon itself, forming a self-gripping, clam-shell type portion which naturally grips the flanged surface of an oven cavity, allowing the front frame to be installed freely by one workman without the need of clamps or extraneous holding means.

According to one aspect of the invention, the region along one edge portion of a bulky, knitted tape is knitted using a conventional plain or jersey knit stitch. According to this aspect of the invention, advantage is taken of the natural tendency of the jersey to curl so that the edge portion naturally curls back upon itself into a clam shell configuration which grips the flanged door frame with sufficient clamping force to maintain the gasket in the proper position for installation of a front frame or the application of fasteners.

Although various forms of tape may be employed, the invention contemplates that the tape be knitted utilizing a ribbed or double knit stitch throughout the major portion of its width. In a preferred embodiment, the basic tape construction involves employment of a ribbed stitch from one edge portion to a section adjacent the second edge portion. A jersey knit stitch is employed adjacent the second edge causing the second edge portion to curl over into the clam shell configuration. Preferably, the tadpole or tail of the conventional tadpole type gasket is attached by sewing along a sew line adjacent one of the edge portions. To impart flexibility to the knitted tape along the line adjacent to but spaced from the jersey knit portion, a ladder textile construction is employed so as to further allow for flexibility to eliminate bunch up of the tape when formed around corners and other surface irregularities. The ladder construction also allows for the easy penetration of clips or other fasteners.

The invention also has applicability to the attachment of other tubular conduits and sleeves, such as are used in the bundling and protection of wires, cables and other elongated substrates. Monofilament materials may be used wholly or in combination with the bulking yarn in the tape as well as the tubular conduit or sleeve.

DETAILED DESCRIPTION OF THE DRAWINGS

DETAILED DESCRIPTION OF THE PREFERRED EMBODIMENT OF THE INVENTION

Figure 1:
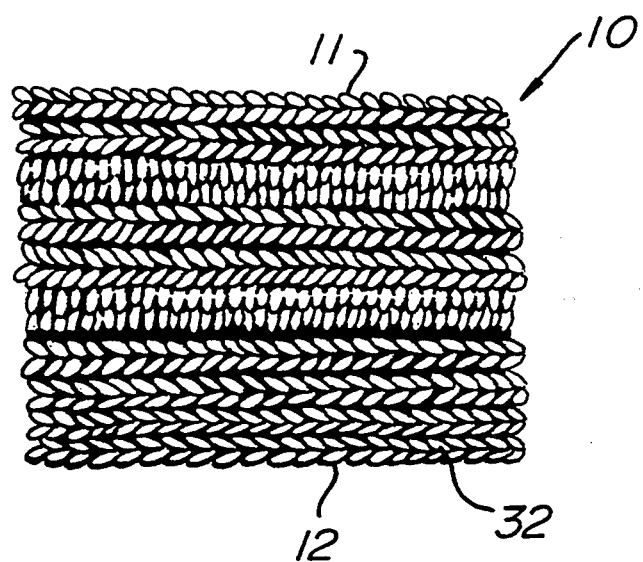
FIG. 1 is a front view of a section of tape constructed in accordance with the teachings of the present invention.
Figure 2:
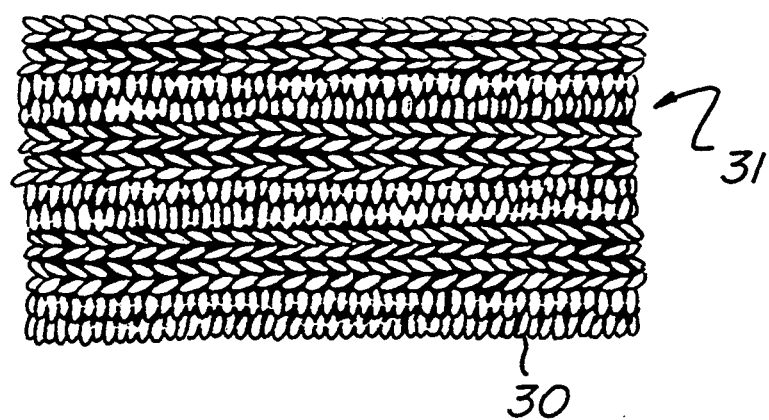
FIG. 2 is a reverse view of the tape of FIG. 1.

With reference first to FIGS. 1 and 2, the front and reverse sides of a knitted tape product formed in accordance with the invention are illustrated. Although other textile materials may be employed for high temperature gasket and seal applications, the tape is preferably knitted from a heat resistant, bulky yarn of a ceramic or glass fiber, such as 9.0 Texo Fiberglass. For applications involving the bundling of wires or cables, the tape may be knitted from monofilaments of engineered plastic materials. As illustrated, the tape 10 has a first edge portion 11 and a second edge portion 12. The major portion of the tape is knitted utilizing a balanced stitch with face and back loops. In a preferred construction, a rib stitch is knitted, although an inter lock stitch and variations may be employed. The rib stitch portion preferably extends over a major portion of the width of the tape and gives the tape an excellent degree of stretch and elasticity, as well as substantial body. The tape of the kind employed may typically have a width of up to about 2" and a thickness in the rib stitch portion of about ⅛.

Figure 4:
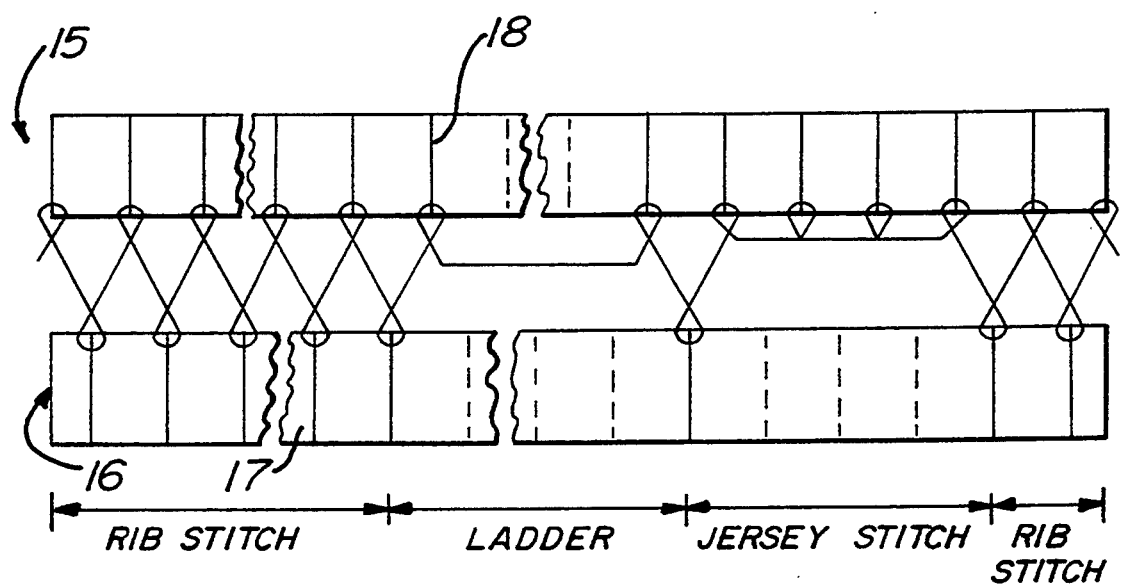
FIG. 4 is a schematic view of a conventional V-bed knitting machine showing the needles employed in the front and back needle beds in the knitting of tape used in the present invention.

The tape is preferably knitted on a conventional V-bed knitting machine. A schematic rendering of a V-bed knitting machine is illustrated in FIG. 4. The knitting machine comprises a back needle bed 15 and a front needle bed 16. The left-hand side of FIG. 4 illustrates the deployment of sets of needles 17 and 18 in the back and front needle beds, respectively. The yarn is schematically represented by the reference character 20. By the placement of alternating needles in both the front and back needle beds so that both face loops and back loops are formed, a balanced 1×1 rib stitch is knitted. FIG. 4 represents the knitting of a tape having a first section coursewise adjacent a first edge in which a 1×1 rib stitch is employed. A second section is knitted coursewise adjacent the first wherein three sets of needles are removed to obtain a ladder configuration running lengthwise or walewise of the tape, and a second section wherein two sets of needles in the front needle bed are removed forming a jersey knit. Finally, the edge portion of the fabric is illustrated at the right-hand side of FIG. 4, wherein two sets of needles knit a rib stitch along the edge. The broken lines in FIG. 4 indicate that the knitted fabric, and in particular the rib stitch and ladder portions, may be varied in width depending upon the application for the gasket product.

As indicated above, the jersey knit portion of the fabric has a natural tendency to curl due to the imbalance produced by the absence of front needles and the elimination of the face loops. The invention takes advantage of this inherent characteristic of jersey knit fabric by providing a jersey knit section adjacent to the right-hand edge, as viewed in FIG. 4. Thus, the right-hand edge portion curls back upon itself towards the fabric face forming a clam shell having the capability of curling over a flanged surface holding the tape in position relatively to the surface. In contrast, the rib stitched portion has no such tendency to curl.

Figure 3:
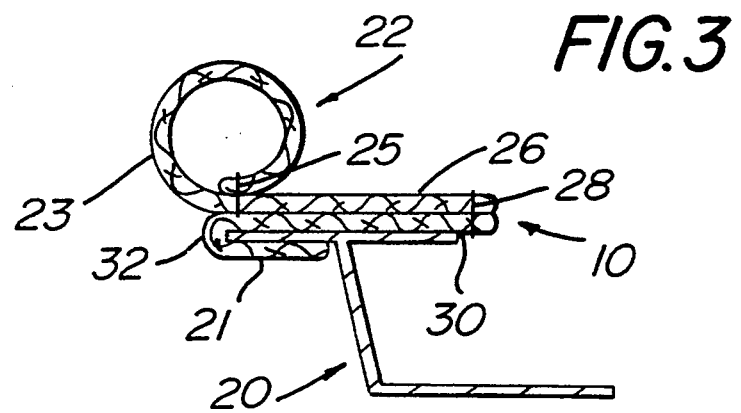
FIG. 3 is a cross-sectional view of a gasket product installed on a flanged portion of an oven door frame.

FIG. 3 is a cross-sectional view of a gasket product utilizing the tape of FIGS. 1 and 2. In FIG. 4, an oven door frame 20 of conventional construction is provided with a flange 21 to which the gasket product is affixed. As is shown in FIG. 3, a gasket product comprises a tadpole gasket 22 which preferably includes outer tubular element 23 which is formed of a heat resistant, relatively bulky yarn of glass fiber or ceramic. Typically, the outer yarn layer is supported by an inner tubular layer which may be knitted or braided from a resilient wire fabricated from a material such as stainless steel. Although the gasket per se may be formed in other ways, the preferred gasket is made from a continuous length of braided material which is sewn along a single sew line at the base of the tubular element shown at 25, so as to form the gasket into the well known tadpole shape with tail portion 26 serving as a means for fastening the gasket to tape 10. As illustrated in FIG. 3, the tail is joined to the tape along one edge portion thereof by a single row of stitches, indicated by the reference character 28.

With reference to FIGS. 1-3, the rib stitch portion 30 can be seen as a relatively bulky portion which lies flat on the supporting substrate for support of the gasket and provides a means to which the gasket can be firmly affixed. The intermediate ladder stitch portion 31 serves to enhance the flexibility of the tape which increases the capacity of the tape to bend around corners without bunching or pleating. The jersey stitch portion, illustrated at 32, naturally curves around the flange 21 allowing for mounting the gasket on a substantially rectangular frame and freeing the worker's hands for installation of a front frame over the surface of the tadpole tail 26 or for the installation of other fasteners. The entire construction can be expeditiously fabricated utilizing conventional textile knitting and braiding equipment. The product is inexpensive to manufacture and highly resistant to heat. Ninety degree corners can be formed-smoothly without notching or mitering. Cutting or sewing operations are minimized. The products can be coated or impregnated with silicones, fluorocarbons, graphites or the like to meet specific needs for lubricity, wear or environmental requirements.

I claim:

1. A gasket product comprising:
   a bulky knit tape having a first and second side and having a first edge portion, a first edge extending in a walewise direction along the first edge portion, said knit tape having a main body portion extending in a coursewise direction from the first edge, said main body portion being knitted utilizing stitch resulting in a balanced stitch;
   a tubular gasket secured to the main body portion on the first side thereof extending in the walewise direction along a line spaced from said first edge portion;
   the first edge portion having a lip knitted with a plain jersey stitch, said jersey stitch causing the lip to curl inwardly in a coursewise direction onto the second side of the tape so as to precurve the lip.

2. A gasket product according to claim 1, wherein said tubular gasket comprises an outer tubular member comprised of a glass fiber yarn and an inner tubular member comprised of stainless steel wire.

3. A gasket product according to claim 2, wherein said inner tubular member is knitted and said outer tubular member is braided.

4. A gasket according to claim 1, wherein said tape adjacent to said first edge portion is knitted with a rib stitch.

5. A tubular textile product comprising:
   a knitted tape, said tape having a first edge portion, a first edge and first and second sides, a main body portion extending in a coursewise direction from said first edge portion, said main body portion being knitted with front and back interconnected loops;
   a tubular gasket member disposed in spaced relationship to said first edge portion, said tubular gasket member being braided and being secured to said first side of said main body portion of said tape in a walewise direction; and
   the first edge portion being a jersey knit having a lip curling back upon the second side of the tape.

6. A product according to claim 5, which said tubular textile product is a gasket.

7. A product according to claim 6, wherein said main body portion is knitted with a rib stitch.

8. A product according to claim 7, wherein said rib stitch is a 1×1 rib stitch.

9. A product according to claim 8, wherein said tape is knitted from a bulky yarn.

10. A product according to claim 9, wherein said bulky yarn is a glass fiber yarn.

11. A product according to claim 6, wherein said tape is knitted from a monofilament yarn.

* * * * *

UNITED STATES PATENT AND TRADEMARK OFFICE
CERTIFICATE OF CORRECTION

PATENT NO. : 5,438,852
DATED : August 8, 1995
INVENTOR(S) : Ford

It is certified that error appears in the above-indentified patent and that said Letters Patent is hereby corrected as shown below:

Column 2, line 61, "1/8" should be --1/8"--.

Column 4, line 5, delete " - " between "formed" and "smoothly"

Signed and Sealed this

Twenty-eighth Day of November 1995

Attest:

BRUCE LEHMAN

Attesting Officer        Commissioner of Patents and Trademarks

UNITED STATES PATENT AND TRADEMARK OFFICE
CERTIFICATE OF CORRECTION

PATENT NO. : 5,438,852

DATED : Aug. 8, 1995

INVENTOR(S) : Bruce Ford

It is certified that error appears in the above-identified patent and that said Letters Patent is hereby corrected as shown below:

Column 4, line 17, "stitch" should be --stitches--

Signed and Sealed this

Eighteenth Day of June, 1996

*Attest:*

BRUCE LEHMAN

*Attesting Officer*   *Commissioner of Patents and Trademarks*